United States Patent [19]
Dorner et al.

[11] Patent Number: 5,428,189
[45] Date of Patent: Jun. 27, 1995

[54] CABLE ARRANGEMENT

[75] Inventors: Jürgen Dorner, Wendlingen; Sebastian Grimmeisen, Waiblingen; Bernd Häussler, Ostfildern; Thilo Kühner, Remseck; Franz-Josef Petry, Kernen; Bernhard Rall, Ulm, all of Germany

[73] Assignee: Daimler-Benz AG, Stuttgart, Germany

[21] Appl. No.: 146,908

[22] Filed: Nov. 1, 1993

[30] Foreign Application Priority Data

Oct. 30, 1992 [DE] Germany .................. 42 36 735.2
Jul. 20, 1993 [DE] Germany .................. 43 24 239.1

[51] Int. Cl.⁶ ............................................. H01B 7/08
[52] U.S. Cl. .................. 174/117 F; 174/115; 174/117 R; 439/623
[58] Field of Search ........... 174/117 F, 117 FF, 117 R, 174/115; 439/623, 624, 492

[56] References Cited

U.S. PATENT DOCUMENTS 3,547,718  12/1970  Gordon ............... 174/117 FF
4,978,813  12/1990  Clayton et al. .......... 174/117 F

FOREIGN PATENT DOCUMENTS 1815448    5/1960  Germany .
1120535   12/1961  Germany ............ 174/117 F
1851651    5/1962  Germany .
1986570    3/1968  Germany .
8233003.4  3/1983  Germany .
1166410    6/1989  Japan ............... 174/117 F
 246713   10/1989  Japan ............... 174/117 F Primary Examiner—Morris H. Nimmo
Attorney, Agent, or Firm—McGlew and Tuttle

[57] ABSTRACT

A cable arrangement with two pairs of conductors for two separate circuits, one conductor of a pair is split into two partial conductors. Neutralization, i.e., capacitive and inductive uncoupling of the two circuits is possible by symmetrical arrangement of the conductors.

11 Claims, 2 Drawing Sheets

CABLE ARRANGEMENT

FIELD OF THE INVENTION

The present invention pertains to a cable arrangement for the uncoupled routing of two separate circuits.

BACKGROUND OF THE INVENTION

Cable connections, which have two pairs of conductors, e.g., two signal lines and two supply lines, which may have different cross sections, are frequently used for separate circuits in electronic systems, especially in motor vehicles. The so-called star quad cables have been known for the uncoupled routing of two circuits. These are unfavorable in terms of handling.

SUMMARY AND OBJECTS OF THE INVENTION

The object of the present invention is to provide such a cable arrangement for routing two separate circuits, in which the two circuits mutually influence each other as little as possible, and which the cable arrangement can be handled favorably.

According to the invention, a cable arrangement for the end coupled routing of two separate circuits on two pairs of conductors is provided including a five-lead fiat strip cable. Two conductors of the first pair of conductors are arranged symmetrically in the same plane and on each side of first conductor of the second pair of conductors. The first conductor of the second pair of conductors is a central conductor in the five-lead fiat strip cable. The second conductor of the second pair of conductors is split into two partial conductors. The two partial conductors are arranged symmetrically to the central conductor around the conductors of the first pair of conductors. The conductor cross section of the two partial conductors is half that of the central conductor.

An insulating body is provided around the five-lead fiat strip cable. The insulating body is preferably designed asymmetrically at the outer ends. The two partial conductors are galvanically connected in pin-and-socket connectors of the cable ends and have a common plug contact.

The present invention leads to an arrangement, in which the two circuits are uncoupled both inductively and capacitively, wherein the flat strip cable has, contrary to a conventional arrangement, five leads, which are used for the two circuits in a defined manner. Since the partial conductor of the split conductors located on the outside need to have only half the conductor cross section compared with the central conductor, an increase in weight caused by the conductors can be avoided. Flat strip cables have the practical advantage of simple handling. They can be stripped by insulation displacement connections in one operation and can be contacted with pin-and-socket connectors.

Large numbers of flat strip cables have been known, e.g., from German Utility Patent DE-GM 19 86 570 or U.S. Pat. No. 3,621,118. However, these prior-art flat strip cables are not intended for the uncoupled routing of two separate circuits. Their use in the sense of the present invention has not hitherto been suggested.

The present invention combines simple handling with a high degree of uncoupling of the circuits. It will be illustrated below in detail on the basis of the figures.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
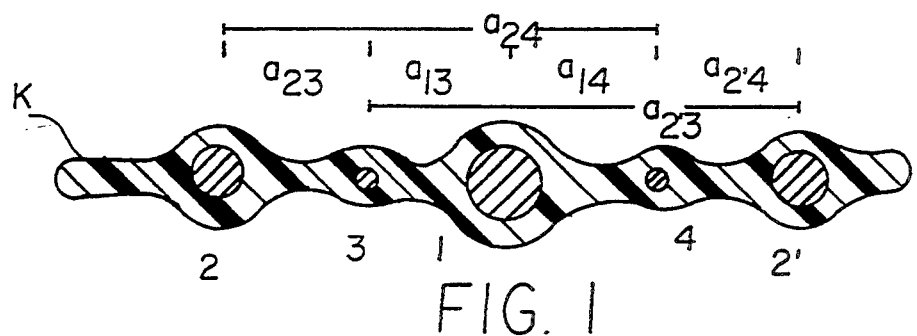
FIG. 1 is a cross sectional view through a flat strip cable for an arrangement according to the present invention.

The flat strip cable, whose cross section is shown schematically in FIG. 1, has five conductors 1, 2, 2', 3 and 4. These conductors are embedded in an insulating body K and also may consist each of a plurality of stranded wires. The conductors 1, 2, 2', 3 and 4 are arranged at mutual distances of $a_{mn}$ from each other along the cable plane. The conductors form two pairs of conductors for two separate circuits, such that the conductors 3 and 4 form outgoing and return conductors of a first pair of conductors, and the; second pair of conductors consists of the conductor 1 and the partial conductors 2 and 2', which together form the second conductor of this pair of conductors. The conductor cross sections may be different and may be adapted to the particular application. For example, the pair of conductors 3 and 4 may be provided as a signal line, and the pair of conductors 1 and 2, 2' as a power supply line. The partial conductors 2', 2" are connected to one another at least at the ends of the conductors, preferably in the pin-and-socket connectors arranged at the cable ends, and are connected in the pin-and-socket connectors to a common contact. The insulating body K of the cable is advantageously designed as an asymmetric insulating body, preferably at the outer ends, in order to ensure a clear association of the signal conductors and to avoid accidental reversal of polarity between the conductors 3 and 4.

Figure 2:
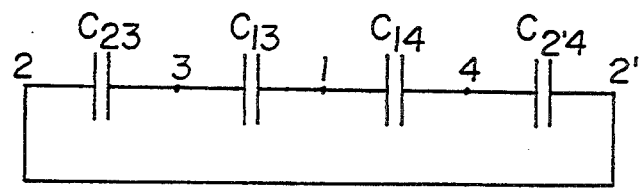
FIG. 2 is a representation of the capacitive conditions on such a cable arrangement.

The capacitances shown in FIG. 2 between adjacent conductors form, via the connection of the partial conductors 2, 2', a capacitive bridge, whose balance condition for capacitive uncoupling, $$C_{13}:C_{23}=C_{14}:C_{2'4},$$

is satisfied because of the symmetry of the arrangement with $C_{13}=C_{14}$ and $C_{23}=C_{2'4}$. The two circuits are consequently capacitively uncoupled.

Figure 3:
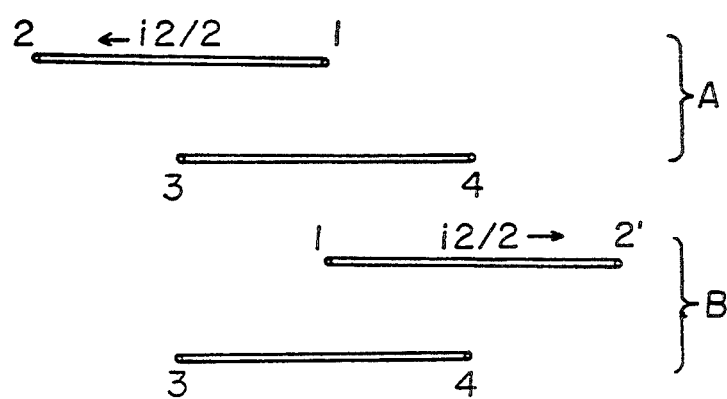
FIG. 3 is a representation of the inductive coupling conditions.

To evaluate the inductive uncoupling situation, the arrangement is considered to be composed of two four-conductor arrangements A and B, as shown schematically in FIG. 3, wherein the partial conductors 2, 2' always carry the same current i2/2. This equal division can be considered to be ensured without further measures because of the skin effect, at least for the high-frequency current components that are relevant for inductive coupling.

The mutual inductance MA of the four-conductor arrangement A with the current loops 1, 2 and 3, 4 is found to be $$MA = 2L \ \text{In} \ ((a_{14} \ a_{23})/(a_{13} \ a_{24})) nH/cm,$$

the mutual inductance MB of the four-conductor arrangement B with the current loops 1, 2' and 3, 4 is $$MB = 2L \ \text{In} \ ((a_{14} \ a_{2'3})/(a_{13} \ a_{2'4})) nH/cm,$$

and the mutual inductance M of the overall arrangement is obtained as the sum $$M = MA + MB,$$

in which L is the cable length in cm. While the mutual inductances MA and MB do not disappear when considered separately, the mutual inductance M of the overall arrangement becomes zero because of the symmetry of the arrangement, namely, $a_{13} = a_{14}$, $a_{23} = a_{2'4}$, and $a_{2'3} = a_{24}$, so that the two circuits are uncoupled also inductively.

Thus, capacitive and inductive uncoupling, i.e., neutralization of the two circuits, as has been known for the star quad cable, which is substantially more complicated to handle, is obtained for the flat strip cable arrangement according to the present invention.

Uncoupling is ensured even when the second circuit is designed as a circuit unbalanced to ground such that the sum i2 of the equal currents i2/2 on the partial conductors 2, 2' is not oppositely equal to the current on the central conductor, e.g., due to asymmetric capacitive coupling with the ground potential of a vehicle body. However, the first circuit with the conductors 3, 4 is balanced to ground in the connected assembly units as well.

The conditions of neutrality apply strictly only to cable laying in open air. Adjacent conductors and metal surfaces may again lead to a weak coupling under certain conditions, but this will not normally exceed a permissible extent. Distortion of the symmetry by external impedances in the connected assembly units is not taken into account.

Figure 4:
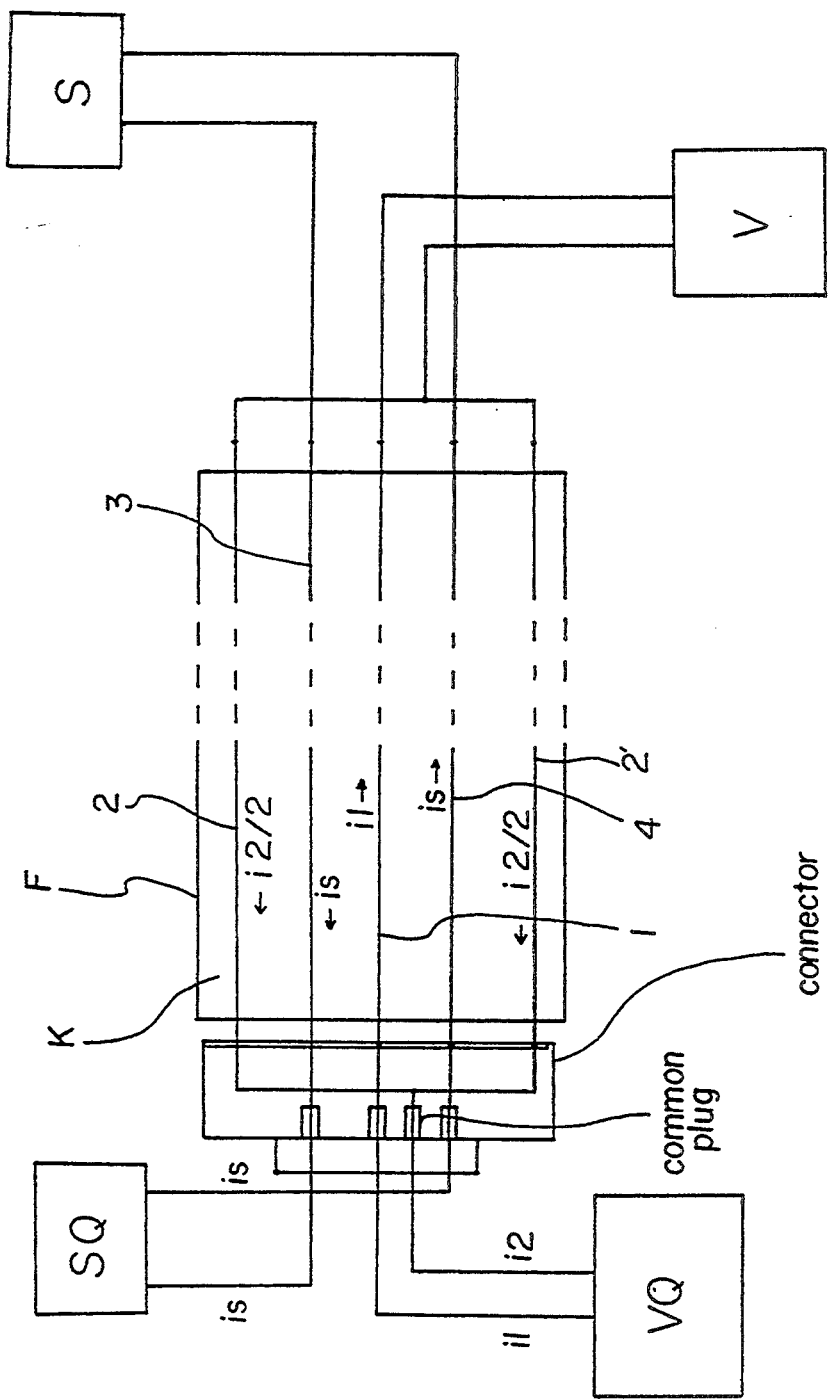
FIG. 4 shows an example of an arrangement with two separate circuits.

FIG. 4 shows an arrangement with a supply voltage source VQ, a user V, a signal source SQ, a sensor S, and a flat strip cable F of the design shown in FIG. 1. The user and the sensor can also be components of one and the same device or component. The supply voltage source VQ and the user V are stations of a first closed circuit, whose current i1 flows via a the lead 1 acting as an outgoing conductor and, in uniform division with i2/2 each, via the leads 2, 2' acting as return conductors of the first circuit. The uniform current distribution between the leads 2, 2' can be ensured, if needed, by additional, known means, such as protective resistors, chokes, etc., with high accuracy, which are preferably integrated in pin-and-socket connectors. The currents i1 and i2(=i2/2+i2/2) do not necessarily have equal value. The signal voltage source SQ and the sensor S form the second circuit. The second circuit is separated from the first circuit, with the leads 3 and 4 acting as outgoing and return conductors, respectively, of the signal current is. Due to the arrangement of the conductors of the two circuits according to the present invention, the circuits are uncoupled from one another over the entire length of the flat strip cable. Both circuits may carry any d.c. and/or a.c. components.

While a specific embodiment of the invention has been shown and described in detail to illustrate the application of the principles of the invention, it will be understood that the invention may be embodied otherwise without departing from such principles.

What is claimed is:

1. A cable arrangement for uncoupled routing of two separate circuits, comprising:
   a five-lead flat strip cable including two pairs of conductors, two conductors of a first pair of conductors being arranged symmetrically on each side of a first conductor of a second pair of conductors, said first conductor of said second pair of conductors being a central conductor of said five-lead flat strip cable, a second conductor of said second pair of conductors being split into two partial conductors, said two partial conductors being arranged symmetrically to said central conductor on each side of said two conductors of said first pair of conductors;
   a first circuit having an outgoing circuit connection and a return connection, said first circuit outgoing connection being connected to a first conductor of said first pair and said first circuit return connection being connected to a second conductor of said first pair; and a second circuit including an outgoing connection and a return connection, said outgoing connection being connected to one of said central conductor and said two partial conductors and said return connection being connected to another of said central conductor and said two partial conductors such that said central conductor and said two partial conductors form a pair of conductors of said second circuit.

2. A cable arrangement according to claim 1, wherein:
   said two partial conductors have a conductor cross sectional area which is half of a conductor cross section of said central conductor.

3. A cable arrangement according to claim 1, further comprising:
   an insulating body surrounding said first conductor pair and said second conductor pair of said five-lead flat strip cable, said insulating body being asymmetrical at outer ends of said five-lead flat strip cable.

4. A cable arrangement according to claim 2, further comprising:
   an insulating body surrounding said first conductor pair and said second conductor pair of said five-lead flat strip cable, said insulating body being asymmetrical at outer ends of said five-lead flat strip cable.

5. A cable arrangement according to claim 1, wherein:
   said two partial conductors are galvanically connected in pin-and-socket connectors at cable ends and have a common plug contact.

6. A cable arrangement according to claim 2, wherein:
   said two partial conductors are galvanically connected in pin-and-socket connectors at cable ends and have a common plug contact.

7. A cable arrangement according to claim 3, wherein:
   said two partial conductors are galvanically connected in pin-and-socket connectors at cable ends and have a common plug contact.

8. A cable arrangement of two separate circuits, comprising: a first circuit having an outgoing connection and a return connection; a second circuit having an outgoing connection and a return connection; and a five-lead flat strip cable including a first pair of conductors for connection to said outgoing and return connections of said first circuit and a second pair of conductors for connection to said outgoing and return connections of said second circuit, two conductors of a first pair of conductors being arranged symmetrically on each side of a first conductor of a second pair of conductors, said first conductor of said second pair of conductors being a central conductor of said five-lead flat strip cable, a second conductor of said second pair of conductors being split into two partial conductors, said two partial conductors being arranged symmetrically to said central conductor on each side of said two conductors of said first pair of conductors.

9. A cable arrangement according to claim 8, wherein:
said two partial conductors have a conductor cross sectional area which is half of a conductor cross section of said central conductor.

10. A cable arrangement according to claim 8, further comprising:
an insulating body surrounding said first conductor pair and said second conductor pair of said five-lead flat strip cable, said insulating body being asymmetrical at outer ends of said five-lead flat strip cable.

11. A cable arrangement of two separate circuits, comprising: a first circuit having an outgoing connection and a return connection; a second circuit having an outgoing connection and a return connection; and a five-lead flat strip cable including a first pair of conductors for connection to said outgoing and return connections of said first circuit and a second pair of conductors for connection to said outgoing and return connections of said second circuit, two conductors of a first pair of conductors being arranged symmetrically on each side of a first conductor of a second pair of conductors, said first conductor of said second pair of conductors being a central conductor of said five-lead flat strip cable, a second conductor of said second pair of conductors being split into two partial conductors, said two partial conductors being arranged symmetrically to said central conductor on each side of said two conductors of said first pair of conductors, said first conductor of said second pair being connected to said second circuit outgoing connection, said two partial conductors being connected to said second circuit return connection.

* * * * *